(12) United States Patent
Toillon et al.

(10) Patent No.: US 9,483,432 B2
(45) Date of Patent: Nov. 1, 2016

(54) GENERIC AND MULTI-ROLE CONTROLLER STRUCTURE FOR DATA AND COMMUNICATION EXCHANGES

(71) Applicant: THALES, Neuilly sur Seine (FR)

(72) Inventors: Patrice Toillon, Fourqueux (FR); Tarik Aegerter, Limours (FR)

(73) Assignee: THALES, Neuilly sur Seine (FR)

( * ) Notice: Subject to any disclaimer, the term of this patent is extended or adjusted under 35 U.S.C. 154(b) by 489 days.

(21) Appl. No.: 14/033,172

(22) Filed: Sep. 20, 2013

(65) Prior Publication Data

US 2014/0095760 A1 Apr. 3, 2014

(30) Foreign Application Priority Data

Sep. 21, 2012 (FR) ...................... 12 02520

(51) Int. Cl.
*G06F 13/36* (2006.01)
*G06F 13/40* (2006.01)

(52) U.S. Cl.
CPC .......... *G06F 13/4027* (2013.01); *G06F 13/36* (2013.01); *G06F 13/4022* (2013.01)

(58) Field of Classification Search
USPC ............. 710/20, 21, 52, 300, 105, 110, 305, 710/306, 310, 313–317
See application file for complete search history.

(56) References Cited

U.S. PATENT DOCUMENTS

| | | | |
|---|---|---|---|
| 5,388,243 A | 2/1995 | Glider et al. | |
| 7,185,135 B1 | 2/2007 | Briggs et al. | |
| 7,203,615 B2 * | 4/2007 | Mao et al. | 702/108 |
| 2002/0152398 A1 * | 10/2002 | Krumrein | 713/200 |
| 2004/0133728 A1 * | 7/2004 | Ellerbrock et al. | 710/305 |
| 2005/0066104 A1 * | 3/2005 | Train et al. | 710/305 |
| 2007/0266179 A1 | 11/2007 | Chavan et al. | |
| 2010/0064082 A1 * | 3/2010 | Ihle et al. | 710/106 |
| 2012/0008697 A1 * | 1/2012 | Emonide et al. | 375/259 |

FOREIGN PATENT DOCUMENTS

WO WO 02/084499 10/2002

OTHER PUBLICATIONS

Profibus Protocol, <http://www.smar.com/en/profibus>, accessed on Feb. 3, 2016.*
Search Report issued in French application No. 1202520 (2013).

\* cited by examiner

*Primary Examiner* — Khanh Dang
(74) *Attorney, Agent, or Firm* — Knobbe, Martens, Olson & Bear, LLP

(57) ABSTRACT

A generic and multi-role controller structure for data and communication exchanges is disclosed. In one aspect, the structure assumes the form of a single component and includes a capability forming a generic data and communication exchange controller, associated with at least: a capability forming a data storage/exchange buffer, a capability forming multiple connection interfaces to several data production/consumption units, one connection interface being associated with one data production/consumption unit, a capability forming multiple connection interfaces with several external data communication buses, and one connection interface being associated with one external data communication bus.

16 Claims, 1 Drawing Sheet

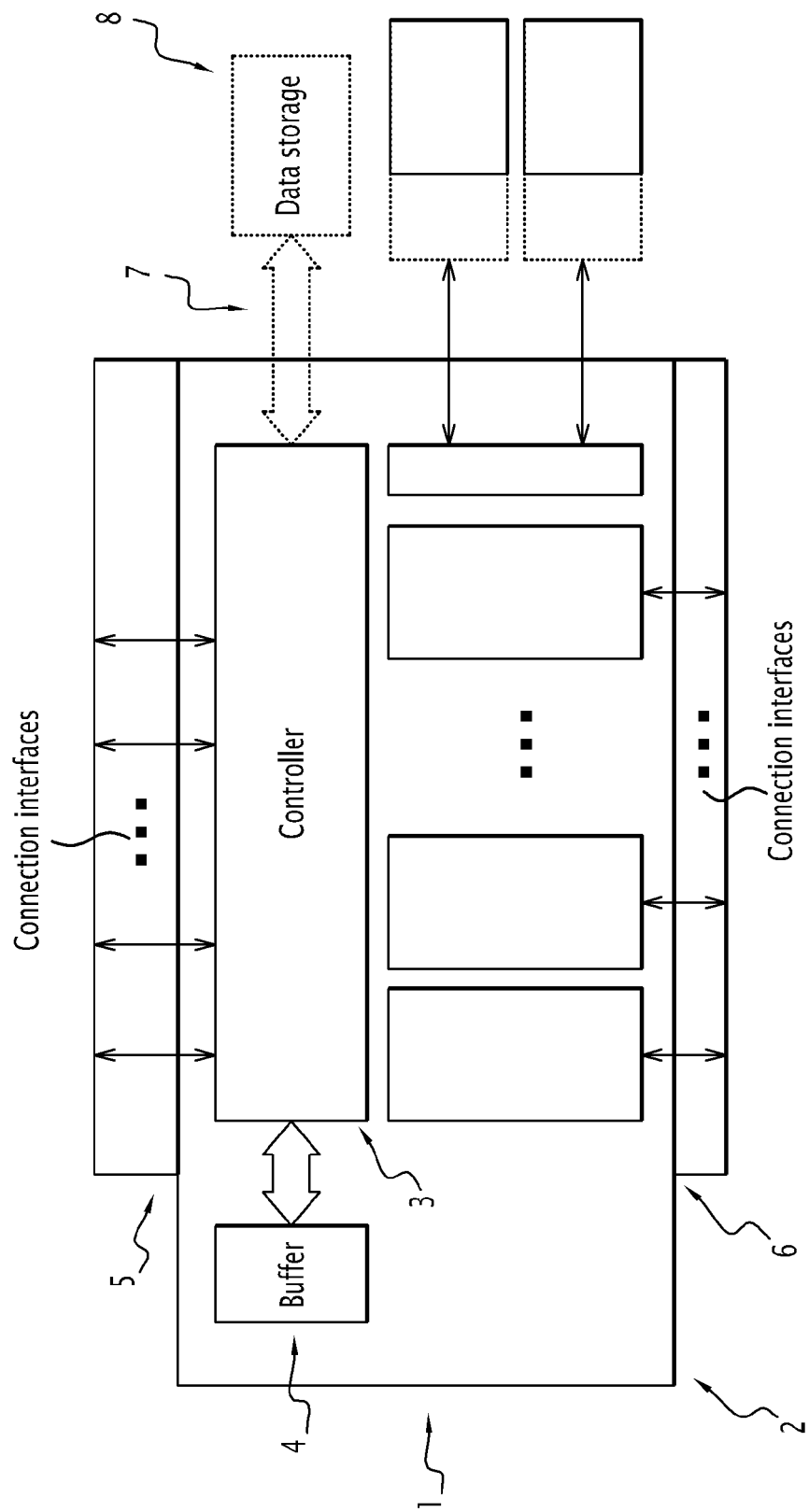

GENERIC AND MULTI-ROLE CONTROLLER STRUCTURE FOR DATA AND COMMUNICATION EXCHANGES

CROSS-REFERENCE TO RELATED APPLICATIONS

This application claims the benefit under 35 U.S.C. §119 of French Application No. 12 02520, filed Sep. 21, 2012, which is herein incorporated by reference in its entirety.

BACKGROUND

1. Technological Field

The present invention relates to a generic and multi-role controller structure for data and communication exchanges. More particularly, the invention relates to such controller structures for data and communication exchanges in the context of the interconnection of onboard equipment, for example on aircraft or in other places.

2. Description of the Related Technology

In general, other types of interconnections for other equipment may of course be considered, irrespective of whether they are onboard such aircraft.

In the state of the art, such structures include as many data and communication exchange controllers as there are needs for connections between data production/consumption units and external data communication buses present in that environment.

SUMMARY OF CERTAIN INVENTIVE ASPECTS

One can see that the design and installation of such structures results in a certain number of drawbacks.

In fact, such structures pose problems including, inter alia, their implementation, bulk, assembly, connection and cost.

Furthermore, the integration of these structures is also extremely difficult, complex, time-consuming and delicate to perform onboard due to the number of pieces of equipment to be connected to each other.

One can see that this may also pose security problems.

The aim of the invention is therefore to resolve these problems.

To that end, the invention relates to a generic and multi-role data and communication exchange controller structure, characterized in that it assumes the form of a single component further including means forming a generic data and communication exchange controller, associated with at least:
  means forming a data storage/exchange buffer,
  means forming multiple connection interfaces to several data production/consumption units, one connection interface being associated with one data production/consumption unit,
  means forming multiple connection interfaces with several external data communication buses, one connection interface being associated with one external data communication bus.

According to other features of the structure according to the invention, considered alone or in combination:
  the data storage/exchange buffer means may or may not be partially integrated into the single component;
  the data storage/exchange buffer means are organized by configuration into elementary structures associated with one or more data messages each, in a partitioned manner;
  access to these elementary structures is authorized by elementary structure by elementary structure configuration, by one or more data production/consumption units as well as to one or more external communication buses and to one or more storage units;
  the single component further includes means for connecting to external data storage means;
  the accesses to these elementary structures are temporally deterministic and have time delay periods that can be calculated irrespective of the accesses to the different data production/consumption units as well as the different external communication buses and different storage units;
  the generic controller means are arranged to allow connections of:
    means forming multiple connection interfaces with data production/consumption units, to each other directly,
    means forming multiple connection interfaces with data production/consumption units, to each other, through the data storage/exchange buffer means,
    means forming multiple connection interfaces with data production/consumption units with means forming multiple connection interfaces to external data communication buses, through the data storage/exchange buffer means,
    means forming multiple connection interfaces between external data communication buses through the data storage/exchange buffer means, including between the receiving and transmitting parts of each external communication bus, and
    means forming multiple connection interfaces to data production/consumption units with means forming multiple connection interfaces to external data communication buses, as well as to each other through the data storage/exchange buffer means;
  the means forming the generic controller are arranged to allow connections of:
    means forming multiple connection interfaces with data production/consumption units to means forming multiple connection interfaces with one or more data storage units through the data storage/exchange buffer means, and
    means forming multiple connection interfaces with external data communication buses to means forming multiple connection interfaces with one or more data storage units through the means forming the data storage/exchange buffer;
  the single component assumes the form of a configurable logic circuit;
  the configurable logic circuit is of the FPGA or ASIC type;
  the data production/consumption unit means are chosen from the group comprising:
    local or remote information processing units,
    processors,
    computers,
    sensors,
    actuators, and
    displays;
  the generic and multirole data and communication exchange controller includes at least one data production/consumption unit;
  the external data communication bus means are chosen from the group comprising digital networks of the avionics A664, A664 Part 7, A429 and A825 type, fieldbuses of the CAN and Flexray type, as well as telecommunications of the IEEE 802.3 type;

the generic data and communication exchange controller means are suitable for supporting communications services and functions pooled between different means forming multiple connection interfaces with one or more external communication buses;

the generic data and communication exchange controller means are suitable for exchanging complete messages with the connection interfaces for connecting to the data production/consumption units and message fragments with the connection interfaces for connecting to the external data communication buses;

the generic data and communication exchange controller means are suitable for individually authorizing the respective operating modes and configurations of each communication interface with each external data communication bus; and the generic data and communication exchange controller means are suitable for individually authorizing the respective operating modes and configurations of each external data storage means.

BRIEF DESCRIPTION OF THE DRAWINGS

The invention will be better understood using the following description provided solely as an example and done in reference to the appended drawing, which shows a block diagram illustrating one example embodiment of a data and communication exchange controller structure according to the invention.

FIG. 1 shows a generic and multi-role data and communication exchange controller structure according to the invention.

DETAILED DESCRIPTION OF THE CERTAIN INVENTIVE EMBODIMENTS

The communication exchange controller structure is designated by general reference 1 in this FIG. 1 and assumes the general form of a single component, designated by general reference 2, further including generic data and communication exchange controller means, designated by general reference 3.

These generic data and communication exchange controller means 3 are associated with different elements, including data storage/exchange buffer means designated by general reference 4 in FIG. 1.

These data storage/exchange buffer means 4 are, in the example illustrated in FIG. 1, completely integrated into the single component 2.

Other embodiments of these means may of course also be considered.

Thus, for example, these storage/exchange buffer means 4 may be partially integrated into the single component and partially outside the component while being connected thereto.

They may also be provided completely outside the single component, by being connected to the latter by any suitable means.

According to other specificities, these data storage/exchange buffer means 4 are organized by configuration into elementary structures associated with one or more data messages each and in a partitioned manner.

In that case, the accesses to these elementary structures may be authorized by elementary structure by elementary structure configuration, by one or more data production/consumption units, as well as to one or more external communications buses and to one or more storage units.

Furthermore, the accesses to these elementary structures are temporally deterministic and have a time delay period that is calculable irrespective of the accesses to the different data production/consumption units as well as different external communication buses and different storage units.

The generic data and communication exchange controller means 3 are also associated with means forming multiple connection interfaces with several data production/consumption units, one connection interface being associated with one data production/consumption unit.

These means forming multiple connection interfaces are designated by general reference 5 in FIG. 1 and will be described in more detail hereafter.

Likewise, the generic data and communication exchange controller means 3 are associated with means forming multiple connection interfaces with several external data communication buses, one connection interface being associated with one external data communication bus.

These multiple connection interface means with several external data communication buses are designated by general reference 6 in FIG. 1.

Lastly, the single component may also be associated with connection means designated by general reference 7 in FIG. 1, for connecting this component to external data storage units or means, such as those designated by general reference 8 in FIG. 1.

Of course, different embodiments of these connection means and these data storage means or units may also be considered.

In fact, the single component 2 as described may for example assume the form of a configurable logic circuit and for example be implemented in the form of a logic circuit of a suitable FPGA or ASIC type.

Other embodiments of this component may of course be considered.

This then makes it possible to determine a certain number of connection functionalities of the generic controller means 3.

In fact, in the structure according to the invention, the generic controller means 3 are arranged to allow connections of:

means 5 forming multiple connection interfaces with data production/consumption units to each other, directly, means 5 forming multiple connection interfaces with data production/consumption units, to each other, through the data storage/exchange buffer means 4, means 5 forming multiple connection interfaces with data production/consumption units to means 6 forming multiple connection interfaces of external data communication buses, through the data storage/exchange buffer means 4, means 6 forming multiple connection interfaces of the external data communication buses through the data storage/exchange buffer means 4, including between the receiving and transmitting parts of each external communication bus, and means 5 forming multiple connection interfaces of the data production/consumption units to means 6 forming multiple connection interfaces with external data communication buses as well as to each other, through the data storage/exchange buffer means 4.

One can see that in the structure, the generic controller means 3 are arranged to allow the described multiple connections, in particular of the different interface and storage/exchange means.

Likewise, these generic controller means 3 are also arranged for example to allow connections of:
- means 5 forming multiple connection interfaces with data production/consumption units to means forming multiple connection interfaces with one or more data storage/exchange units 8 through the data storage/exchange buffer means 4, and
- means 6 forming multiple connection interfaces with external data communication buses to means forming multiple connection interfaces with one or more data storage units 8 through the means 4 forming the data storage/exchange buffer.

The generic controller means 3 constitute a sort of connecting node of the different interface means and other means, for example storage means, previously described.

This then for example makes it possible to connect a certain number of elements, and the data production/consumption unit means may then be chosen from the group comprising:
- local or remote information processing units,
- processors,
- computers,
- sensors,
- actuators, and
- displays.

Of course, other means may be considered.

These means may for example be provided outside the single component 3, and in particular the generic and multi-role data and communication exchange controller.

However, this controller 3 may also internally include at least one data production/consumption unit.

The external data communication bus means may be chosen from the group comprising digital networks of the avionics A664, A664 Part 7, A429 and A825 types, fieldbuses of the CAN or Flexray type, as well as telecommunications of the IEEE 802.3 type.

Of course, other networks may be considered.

The generic data and communication exchange controller means may also be suitable for supporting application services and functions pooled between the different means forming multiple connection interfaces with one or more of these external communication buses.

Thus for example, these communication services and functions may for example relate to each other by UDP/IP, UDP and IP addressing and monitoring, as well as IP fragmentation and IP reassembling.

Of course, this is not limiting on the services and functions, which may thus be supported by these means.

In this context, these generic data and communication exchange controller means 3 may be suitable for exchanging complete messages with connecting interfaces for connecting to the data production/consumption units and message fragments with interfaces for connecting to the external data communication buses.

Likewise, these generic data and communication exchange controller means 3 may be suitable for individually authorizing the respective operating modes and configurations of each connecting interface for connecting to each external data communication bus.

Similarly, generic data and communication exchange controller means 3 may also be suitable for individually authorizing the respective operating modes and configurations of each external data storage means.

One can then see that such a structure has a certain number of advantages in terms of integrating a certain number of elements and functions, which are then pooled, into a single component.

This makes it possible to resolve the aforementioned problems in terms of weight, cost, bulk, reliability, etc. of the structures of the state of the art.

The invention claimed is:

1. A generic and multi-role data and communication exchange controller circuit, comprising:
   a generic data and communication exchange controller,
   wherein the generic and multi-role data and communication exchange controller circuit has the form of a single component, and
   wherein the generic data and communication exchange controller is associated with at least:
   a data storage/exchange buffer,
   a plurality of first connection interfaces to a plurality of data production/consumption units, each of the first connection interfaces being associated with a respective one of the data production/consumption units,
   a plurality of second connection interfaces with a plurality of external data communication buses, each of the second connection interfaces being associated with a respective one of the external data communication buses,
   wherein the generic data and communication exchange controller is configured to enable connections between:
   the first connection interfaces with the data production/consumption units, to each other directly,
   the first connection interfaces with the data production/consumption units, to each other, through the data storage/exchange buffer,
   the first connection interfaces with the data production/consumption units and the second connection interfaces with the external data communication buses, through the data storage/exchange buffer,
   the second connection interfaces with the external data communication buses through the data storage/exchange including between receiving and transmitting portions of each of the external communication buses, and
   the first connection interfaces with the data production/consumption units and the second connection interfaces with the external data communication buses, as well as to each other through the data storage/exchange buffer.

2. The generic and multi-role data and communication exchange controller circuit according to claim 1, wherein the data storage/exchange buffer is partially integrated into the generic and multi-role data and communication exchange controller circuit.

3. The generic and multi-role data and communication exchange controller circuit according to claim 1, wherein the data storage/exchange buffer is organized into elementary structures, each associated with one or more data messages, in a partitioned manner.

4. The generic and multi-role data and communication exchange controller circuit according to claim 3, wherein access to the elementary structures is authorized by elementary structure by elementary structure configuration, by one or more data production/consumption units as well as to one or more external communication buses and to one or more storage units.

5. The generic and multi-role data and communication exchange controller circuit according to claim 1, wherein the single component further includes a connection unit for connecting to an external data storage.

6. The generic and multi-role data and communication exchange controller circuit according to claim 3, wherein the access to each of the elementary structures is temporally deterministic and has a time delay period that is calculated irrespective of the access to the different data production/consumption units as well as the different external communication buses and different storage units.

7. The generic and multi-role data and communication exchange controller circuit according to claim 4, wherein the generic data and communication exchange controller is configured to individually authorize the respective operating modes and configurations of each external data storage units.

8. The generic and multi-role data and communication exchange controller structure circuit according to claim 1, wherein the generic data and communication exchange controller is configured to enable connections between:
the first connection interfaces with the data production/consumption units and a plurality of third connection interfaces with one or more data storage units through the data storage/exchange buffer, and
the second connection interfaces with the external data communication buses and the third connection interfaces with the one or more data storage units through the forming the data storage/exchange buffer.

9. The generic and multi-role data and communication exchange controller circuit according to claim 1, wherein the generic and multi-role data and communication exchange controller circuit is a configurable logic circuit.

10. The generic and multi-role data and communication exchange controller circuit according to claim 9, wherein the configurable logic circuit is of the field-programmable gate array (FPGA) or application-specific integrated circuit (ASIC) type.

11. The generic and multi-role data and communication exchange controller circuit according to claim 1, wherein the data production/consumption units are selected from among:
local or remote information processing units,
processors,
computers,
sensors,
actuators, and
displays.

12. The generic and multi-role data and communication exchange controller circuit according to claim 1, wherein the generic and multirole data and communication exchange controller includes at least one data production/consumption unit.

13. The generic and multi-role data and communication exchange controller circuit according to claim 1, wherein the external data communication are selected from among:
digital networks of the avionics A664, A664 Part 7, A429 and A825 type,
fieldbuses of the CAN and Flexray type, and
telecommunications of the IEEE 802.3 type.

14. The generic and multi-role data and communication exchange controller circuit according to claim 1, wherein the generic data and communication exchange controller is configured to support communications services and functions pooled between different a plurality of third connection interfaces with one or more external communication buses.

15. The generic and multi-role data and communication exchange controller circuit according to claim 1, wherein the generic data and communication exchange controller is configured to exchange complete messages with the first connection interfaces for connecting to the data production/consumption units and message fragments with the second connection interfaces for connecting to the external data communication buses.

16. The generic and multi-role data and communication exchange controller circuit according to claim 1, wherein the generic data and communication exchange controller is configured to individually authorize the respective operating modes and configurations of each of the second communication interfaces with each external data communication bus.

* * * * *